July 14, 1931.  W. E. HAYWARD  1,814,087

DEVICE FOR USE ON LATHES OR THE LIKE

Filed May 18, 1929

Inventor
Wilbur E. Hayward
his Attorney

Patented July 14, 1931

1,814,087

UNITED STATES PATENT OFFICE

WILBUR E. HAYWARD, OF LOS NIETOS, CALIFORNIA

DEVICE FOR USE ON LATHES OR THE LIKE

Application filed May 18, 1929. Serial No. 364,143.

This invention has to do with a device for use on a lathe, or the like, and has particular reference to a device for use as either a centering drill holder or a center.

It is general practice, when operating a lathe, to clamp the work in a chuck carried by the head stock and fix a centering drill in the tail stock spindle to form a center opening in the work or object to be turned. The tail stock spindle is advanced so that the drill is fed into the work. When the center opening has been formed, the tail stock spindle is retracted to permit the removal of the drill and must be further retracted to allow the center to be mounted in the spindle. After the center has been mounted in the spindle, the tail stock spindle is again advanced to feed the center into engagement with the piece of work. As the center drill holder and the center have comparatively long shanks, it is necessary to operate the tail stock spindle a considerable distance back and forth during the operations referred to above. It requires considerable time to operate the spindle for these operations, and, further, a piece of work mounted on a center in the manner described above is usually carried by the center at a point a considerable distance from the tail stock body and therefore the work is not supported as firmly as it would be if the body of the tail stock were located close to the work.

It is the general object of the invention to provide a device for use on a lathe, or the like, that will carry a centering drill and that will also act as a center, and to provide a device of this character that necessitates operating the tail stock or the tail stock spindle only a very short distance to bring the device into operating position when forming a center opening or when centering the work.

It is another object of the invention to provide a device of the character mentioned that is practical and of simple construction.

It is a further object of the invention to provide a device of the character mentioned that is easily mounted on a lathe and which can be quickly and readily converted from a centering drill to a center.

A further object of the invention is to provide a device of the character mentioned in which the centering drill bit is replaceable.

Figure 1:
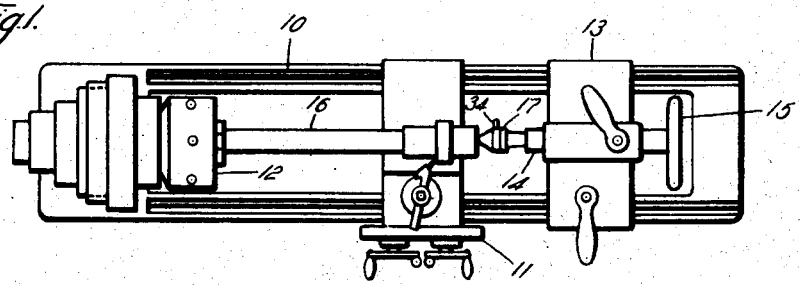
Figure 2:
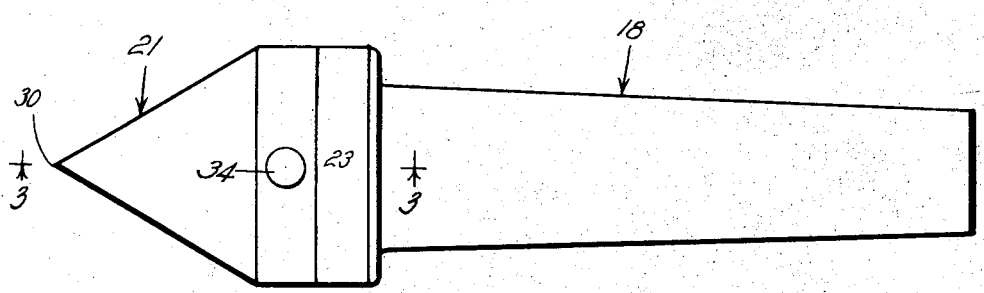
Figure 3:
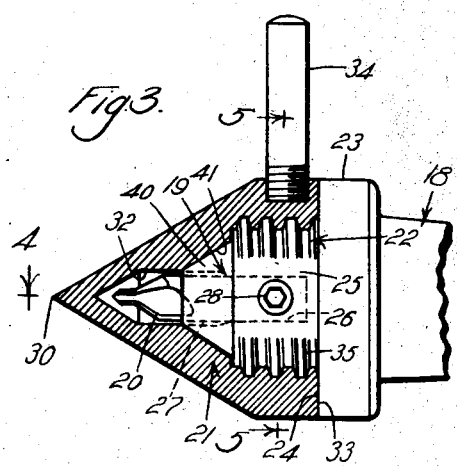
Figure 4:
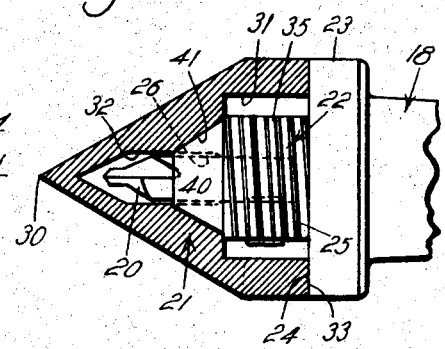
Figure 5:
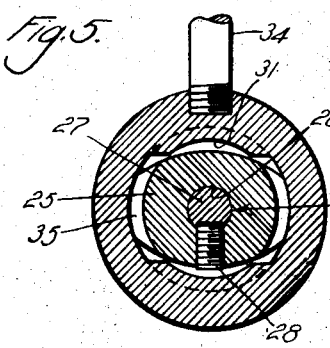
Figure 6:
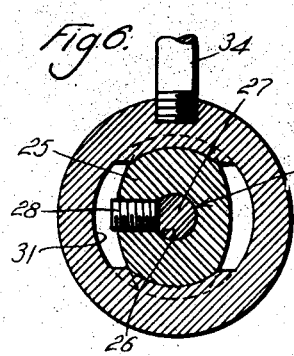
Figure 6:
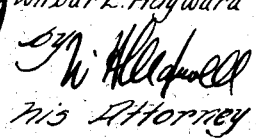

Other objects and features of the invention will be best and more fully understood from the following detailed description of a typical form and application of the invention, throughout which description reference is had to the accompanying drawings, in which:

Fig. 1 is a top or plan view of a typical form of lathe showing the device provided by this invention in operating position on the tail stock or dead spindle and operating as a center. Fig. 2 is an exterior view of the device showing the parts assembled so that the device can be used as a center. Fig. 3 is a detailed sectional view taken substantially as indicated by line 3—3 on Fig. 2 showing certain parts in elevation. Fig. 4 is a detailed sectional view taken as indicated by line 4—4 on Fig. 3. Fig. 5 is a transverse detailed sectional view taken substantially as indicated by line 5—5 on Fig. 3 showing the parts in position to be separated. Fig. 6 is a view similar to Fig. 5 showing the parts set together, or connected.

In the following detailed description I will describe the invention as used on a typical form of lathe. It is to be understood, however, that the invention is not to be construed as limited to the specific application and form described. In the drawings I have shown a common form of lathe including, a chassis or bed 10, a carriage 11, a chuck 12, a tail stock 13 shiftably mounted on the bed, a tail stock spindle 14 slidably carried in the body of the tail stock, a hand wheel 15 for operating the spindle 14, and various other parts common to machines of this character. A piece of work 16 is shown held in the chuck 12 and centered on the device 17 provided by this invention, the device being carried by the spindle 14. The spindle 14 is operable horizontally in the tail stock 13, while the tail stock is operable to various positions along the bed.

The device provided by this invention includes, generally, a body or shank 18 having a chuck 19 to carry a drill 20, a center or center head 21, and means 22 for detachably mounting the center head on the shank 18 to convert the device from a drill or boring tool to a center.

The body or shank 18 is an elongate member round in cross section and is adapted to fit or cooperate with the center carrying opening of the tail stock spindle 14. In most lathes the opening in the spindle is round and tapered or inwardly convergent, so therefore I have shown the shank 18 as being tapered. It is to be understood, however, that the shank may be shaped to cooperate with center carrying openings of different configurations. In the particular form of the invention illustrated the shank 18 is provided at its large end with an enlargement or head 23. The head 23 may be in the form of a radial flange at the extreme end of the shank. The head 23 preferably has a flat outer end 24. A centrally located pin portion 25 projects from the outer end 24 and is preferably concentric with the longitudinal axis of the shank 18. The pin portion 25 is considerably smaller in diameter than the head 23 so that the face or outer end 24 of the head forms a comparatively large shoulder around the inner end of the pin portion 25.

The chuck 19 is formed in the outer end of the pin portion 25 and may include a central longitudinal opening 26 extending into the end of the pin portion. The opening 26 is adapted to carry the shank 27 of the drill bit 20 and may be round in cross section. The opening 26 is concentric with the longitudinal axis of the shank 18. Means is provided for holding the drill bit 20 firmly in the opening 26. In the particular case illustrated a set screw 28 screw threads transversely through the pin portion 25 and extends into the opening 26 to engage the shank 27 of the drill. The set screw 28 is preferably of the socket head type so that it does not normaly project from the pin portion. It is evident that other means may be employed to mount the drill on the device without departing from the broader aspects of the invention.

The center or center head 21 is detachably mounted on the shank to extend into a center opening formed in the piece of work 16. The center head may be of any desired shape or form. In the particular form of the invention shown in the drawings the drill head 21 is a conical member round in cross section. The center head is provided with a sharp pointed end 30 to extend into an opening in a piece of work which may have been formed by the drill 20 before mounting the center head on the shank. The pointed end 30 is concentric with the opening 26 and is therefore concentric with the longitudinal axis of the shank 18. The large end portion of the center head is preferably of about the same diameter as the head 23 of the shank. The large end 33 of the center head is preferably made flat to engage or seat against the end 24 of the head 23. The center head 21 is intended to be applied to the large end of the shank 18 and is made hollow to receive or contain the pin portion 25 and the drill bit 20 when attached to the shank. A comparatively large opening 31 extends for a short distance into the large end portion of the center head and a smaller opening 32 is provided in or continues from the inner end of the opening 31. The opening 31 is provided to receive the pin portion 25 while the opening 32 is provided to receive the drill bit 20. The center head 21 may be provided with a handle 34. In operation the center head becomes heated by the friction of the piece of work 16 rotating on it. It is therefore desirable to provide a handle for handling the center head when it becomes heated. I have shown a simple form of handle 34 consisting of a short rod screw threaded into one side of the large end portion of the center head 21.

The means 22 provided for detachably connecting the center head 21 to the shank 18 may be any suitable form or construction. In the preferred form of the invention illustrated the means 22 is in the form of a screw connection. In the drawings I have shown the exterior pin portion 25 provided with broken screw threads 35 and have shown the wall of the opening 31 provided with broken threads to cooperate with the threads of the pin portion. The screw threads 35 extend for a short distance around diametrically opposite sides of the pin portion 25 and in a like manner the threads in the opening 31 extend for a short distance around diametrically opposite sides of the wall of the opening. The screw threads on the pin portion and the opening 31 are related so that the center head may be tightened against the outer end 24 of the head 23 by turning the center head approximately one-quarter of a turn, and so that the center head may be detached from the shank 18 by giving it approximately one-quarter turn and then moving it away from the shank. When the center head is mounted in operating position on the shank, the end 33 of the center head abuts or engages the end 24 of the head 23. The center head 21, when in operating position, completely covers and encloses the pin portion 25 and the drill bit 20 so that the device has the appearance of a more or less common center. The center head 21 is shaped and mounted on the shank so that it operates effectively as a center. Fig. 5 of the drawings shows the center head in position to be connected to the shank and Fig. 6 shows the center head 21 and the shank connected. With this form of connection the center head 21 is easily and quickly mounted and dismounted from the shank. It will be apparent that the invention is not confined to the particular form of connection described above, but may embody other forms of connections for these parts without departing from its broader features.

The outer end of the pin portion 25 is provided with a tapered centering projection 40. The projection 40 fits into a tapered portion 41 of the opening 31 of the center head, when the center head 21 is mounted on the pin portion 25. The projection 40 is provided to center the head 21 on the pin portion. When the device is in operation as a centering tool, the projection 40 acts to center the head 21 on the shank and centers the head so that it cannot shift laterally on the pin portion 25. The inner end 33 of the center head abuts the shoulder 24 and holds the center head against longitudinal movement relative to the shank 18.

It will be apparent from the foregoing description that the device provided by this invention is of great utility and is very simple of formation and operation. In using the device the shank 18 is inserted in the opening of the tail stock spindle 14. When it is desired to drill a center hole in a piece of work in the lathe, the center head 21 is removed from the shank and the spindle 14 is advanced so that the drill bit 20 is brought into engagement with the work. When the center hole has been formed in the work and it is desired to support the work on a center carried by the tail stock, the spindle 14 is retracted for a short distance and the center head 21 is mounted on the shank 18 in the manner described above. The spindle 14 is then again advanced so that the pointed end 30 of the center head enters the opening formed in the piece of work by the drill bit 20, and is brought into engagement with the work. By using the device of this invention it is not necessary to apply different tools to the spindle 14 to center drill and to center work on the spindle. It is also to be noted that the drill 20 is replaceable and that the device is adapted to carry various sizes of drill bits. The particular means 22 for detachably connecting the center head to the shank, described in the foregoing description, is extremely simple of formation and operation and is effective in securing the drill head on the shank.

Having described only a typical, preferred form of the invention, I do not wish to limit myself to the specific details set forth, but wish to reserve to myself any changes or variations that may appear to those skilled in the art or fall within the scope of the following claims:

Having described my invention, I claim:

1. A device of the character described including, a shank adapted to fit the opening in a lathe tail stock, a radial flange on the shank to be disposed beyond the tail stock, a pin projecting outwardly from the flange, a tapered projection on the pin, a drill carried by the pin and extending from the projection, a center head having an opening to receive the pin and drill and having a tapered wall to seat on the projection, and a releasable connection between the center head and the pin, the end of the head being in engagement with the flange when the connection is made.

2. A device of the character described including, a shank adapted to fit the opening in a lathe tail stock, a radial flange on the shank to be disposed beyond the tail stock, a pin projecting outwardly from the flange, a tapered projection on the pin, a drill carried by the pin and extending from the projection, a center head having an opening to receive the pin and drill and having a tapered wall to seat on the projection, and an interrupted thread connection between the center head and the pin, the end of the head being in engagement with the flange when the connection is made.

In witness that I claim the foregoing I have hereunto subscribed my name this 17th day of April, 1929.

WILBUR E. HAYWARD.